United States Patent [19]

Hasegawa

[11] Patent Number: 4,821,132

[45] Date of Patent: Apr. 11, 1989

[54] ROTARY HEAD TYPE RECORDING APPARATUS USING ROTARY ERASING HEAD

[75] Inventor: Masahide Hasegawa, Kawasaki, Japan

[73] Assignee: Canon Kabushiki Kaisha, Tokyo, Japan

[21] Appl. No.: 921,623

[22] Filed: Oct. 21, 1986

[30] Foreign Application Priority Data

Oct. 31, 1985 [JP] Japan ............................ 60-242894

[51] Int. Cl.$^4$ .............................................. G11B 5/02
[52] U.S. Cl. ..................................... 360/108; 360/66; 360/84; 360/107
[58] Field of Search ............... 360/10.3, 64, 66, 84, 360/107, 108, 130.24

[56] References Cited

U.S. PATENT DOCUMENTS

| 4,520,405 | 5/1985 | Sasaki et al. ................. 360/10.3 |
| 4,614,985 | 9/1986 | Tsuruta ........................... 360/64 |
| 4,639,805 | 1/1987 | Hirota et al. ................. 360/108 |

FOREIGN PATENT DOCUMENTS

| 110680 | 6/1984 | European Pat. Off. ............ 360/64 |
| 206895 | 12/1986 | European Pat. Off. ............ 360/66 |
| 53-129016 | 10/1978 | Japan ............................ 360/66 |
| 56-163503 | 12/1981 | Japan ............................ 360/66 |
| 61-3306 | 1/1986 | Japan ............................ 360/66 |

Primary Examiner—John H. Wolff
Attorney, Agent, or Firm—Robin, Blecker & Daley

[57] ABSTRACT

A rotary head type recording apparatus includes a rotary head member having four rotary heads and a rotary erasing head, a rotary transformer member having an erasing coil which is connected to the rotary erasing head and four recording coils which are respectively connected to the four rotary heads, wherein the erasing coil and the four recording coils lie in a common surface of the rotary transformer member and the erasing coil is arranged so that two of the four recording coils are on each side of the erasing coil. A recording device supplies recording signals to the four recording coils to record the recording signals on a recording medium by use of the four recording coils and an erasing device supplies an erasing signal to the erasing coil to erase signals recorded on the recording medium by use of the erasing head. The erasing device does not supply the erasing signal to the erasing coil when the recording device is supplying recording signals to at least one of two recording coils arranged adjacent to and on opposite sides of the erasing coil.

10 Claims, 4 Drawing Sheets

DIRECTION OF ROTATION

| COMBINATION | | | | | | | | | | | | | | | | |
|---|---|---|---|---|---|---|---|---|---|---|---|---|---|---|---|---|
| I | | II | | III | | IV | | V | | VI | | VII | | VIII | |
| HEAD | COIL | HEAD | COIL | HEAD | COIL | HEAD | COIL | HEAD | COIL | HEAD | COIL | HEAD | COIL | HEAD | COIL |
| 7A | 1A | 7A | 1A | 7A | 1B | 7A | 1B | 7A | 1D | 7A | 1D | 7A | 1E | 7A | 1E |
| 7B | 1D | 7B | 1E | 7B | 1D | 7B | 1E | 7B | 1A | 7B | 1B | 7B | 1A | 7B | 1B |
| 7C | 1B | 7C | 1B | 7C | 1A | 7C | 1A | 7C | 1E | 7C | 1E | 7C | 1D | 7C | 1D |
| 7D | 1E | 7D | 1D | 7D | 1E | 7D | 1D | 7D | 1B | 7D | 1A | 7D | 1B | 7D | 1A |
| 8 | 1G | 8 | 1G | 8 | 1G | 8 | 1G | 8 | 1G | 8 | 1G | 8 | 1G | 8 | 1G |

| COMBINATION II | |
|---|---|
| HEAD | COIL |
| 7A | 1A |
| 7B | 1E |
| 7C | 1B |
| 7D | 1D |
| 8 | 1G |

ROTARY HEAD TYPE RECORDING APPARATUS USING ROTARY ERASING HEAD

BACKGROUND OF THE INVENTION

1. Field of the Invention

This invention relates to rotary head devices, and more particularly to rotary head devices having a plurality of heads rendered operative in sequence to record or reproduce signals.

2. Description of the Related Art

Recently, in the field of video cassette recorders (VCRs), to realize minimization of the size and diameter of the rotary head assembly, a type of recorder has become known wherein a magnetic tape is wound around the rotary head assembly over a wider angle range than 270° and four rotary heads which rotate in phase intervals of 90° are used in sequence when signals are recorded or reproduced.

When an erasing head is with a rotary head cylinder having such four recording/reproducing heads, the accompanying rotary transformer requires five channels.

In general, such a multiple-channel rotary transformer has a shortcoming in the that the adjacent two of the channels are cross-talked. The method for lessening this is to separate the core itself, or to create an intervening groove a short-circuit ring (coil) occupies, or to arrange the channels so that the adjacent two of them are not used simultaneously, and the coils of the channels not in use are short-circuited.

Of these, the 5-channel rotary, transformer using the short-circuit ring is exemplified in FIG. 1 where seven coils 1A to 1G are arranged in respective annular grooves 2A to 2G formed in a core 3 of the rotor, and another seven coils 1A' to 1G' are arranged in respective annular grooves 2A' to 2G' formed in a core 3' of the stator. Of these coils 1A–1G and 1A'–1G', the 1C, 1F, 1C' and 1F' are the short-circuit rings. So, there is little cross-talk between the coil 1B–1B' and the coil 1D–1D' and between the coil 1E–1E' and the coil 1G–1G'

FIG. 2 shows a head arrangement in the rotary head cylinder using such a transformer. 4 is a rotary head drum. On its outer periphery, a tape 5 is wound obliquely over a range of more than about 270° by posts 6A and 6B. Four heads 7A to 7D are arranged on the rotary drum 4 with their phases differing from each other by 90°, and are switched over successively in the order: 7A→7B→7C→7D→7A and so on, when signals are recorded or reproduced. Also, to prevent the signals from dropping out when each head 7A–7D is switched over, the angle of winding of the tape 5 is made equal to $270° + 2\theta_0°$. The switching over from the head 7D to the head 7A is carried out when both heads 7D and 7A lie just in the positions shown in FIG. 2. An erasing rotary head 8 is set up in a delayed position from the head 7A in a clockwise direction by an angle of $\theta°$. The combinations of connection between each head 7A–7D and 8 and each coil 1A–1G of the rotary transformer are so chosen that the adjacent coils 1A and 1B, and coils 1C and 1D are not used simultaneously. Such combinations are eight in number as shown in the table of FIG. 3.

FIG. 4 shows a timing chart for switching over the heads and the transformer when in the recording or reproduction mode with the employment of the combination II. At first, when recording, while erasing current is allowed to always flow to the coil 1G which is connected to the erasing head 8, the flow of recording current to the coils 1A, 1E, 1B and 1D which are connected to the recording/reproducing heads 7A to 7D respectively is switched over in sequence at a timing depending on the phase of rotation of the heads 7A to 7D as shown in the drawing. In the waveforms of FIG. 4, the period of H level is the period during which the recording current flows. In the period of L level, the coils of the stator are short-circuited to produce a similar effect to that of the short-circuit rings 1C and 1F. By taking into account the fact that when the heads are switched over, its switching-over timing is deviated from the coincidence with the supply timing of the recording current, the recording current must be made to flow simultaneously to the adjacent two heads, for example, the heads 7A and 7D for a period shown by $t_0$ in the figure. Because the corresponding coils 1A and 1D to these two heads 7A and 7D are not adjacent to each other, each other's interference due to the cross talk does not take place. Also, the coils which are connected to any adjacent two of the other heads are not adjacent to each other, or lie on the opposite side of the short-circuit ring 1C. Therefore, the problem of the cross-talk between the recording currents does not arise.

Further, because the short-circuit ring 1F intervenes between the coil 1G for the rotary erasing head 8 and the other coils for the heads, there is no possibility of occurrence of the erasing current leaking into the recording current.

Even when in the reproduction mode, the problem of cross-talk does not arise from the similar reason.

However, the above-described rotary transformer has seven grooves and seven coils. To improve its characteristics, therefore, the size is necessarily increased, giving rise to a problem in that it is not suited to a minimization of the size of the rotary head device.

For the characteristics of the transformer, for example, the transmission loss, can be more improved as the confronting area for each channel increases, and the larger the number of turns of the coil, the easier the good characteristics are obtained.

SUMMARY OF THE INVENTION

An object of the present invention is to provide a rotary head device which enables the above-described problems to be eliminated.

Another object of the present invention is to provide a rotary head device of reduced cross-talk between any two of the heads, while still permitting the size to be minimized.

Under such an object, according to the present invention, in an embodiment thereof, the rotary head device is constructed as comprising a rotary head cylinder having four rotary heads and a rotary erasing head, a rotary transmitter including a rotary member having five coils connected respectively to the four rotary heads and rotary erasing head, that coil which is connected to the rotary erasing head being arranged at the center thereof, recording means for supplying recording signals to the four rotary heads so that the signals are recorded on a recording medium, and erasing means for supplying an erasing signal to the rotary erasing head when the signal recorded on the recording medium is erased by using the rotary erasing head.

Still another object of the invention is to provide a rotary head device of reduced cross-talk of the erasing signal flowing to an erasing head into the recording current with a minimum size.

Under such an object, according to the present invention, in an embodiment thereof, the rotary head device is constructed as comprising a rotary head cylinder having a plurality of rotary heads and a rotary erasing head; recording means for supplying recording signals to the plurality of rotary heads when the signals are recorded on a recording medium by using them; erasing means for supplying an erasing signal to said erasing head when the signals recorded on the recording medium are erased by using the rotary erasing head, whereby when the recording signals are supplied to the prescribed two of the plurality of rotary heads, the erasing means does not supply the erasing signal to the rotary erasing head; and a rotary transformer including a rotary member having rotary coils connected respectively to the plurality of rotary heads and the rotary erasing head, those of the coils which are connected to the prescribed two rotary heads being arranged on the opposite side of that rotary coil which is connected to the rotary erasing head.

The other objects other than the above-described ones, and features of the invention will become apparent from the following detailed description of embodiments thereof by reference to the accompanying drawings.

DETAILED DESCRIPTION OF THE PREFERRED EMBODIMENTS

Figure 1:
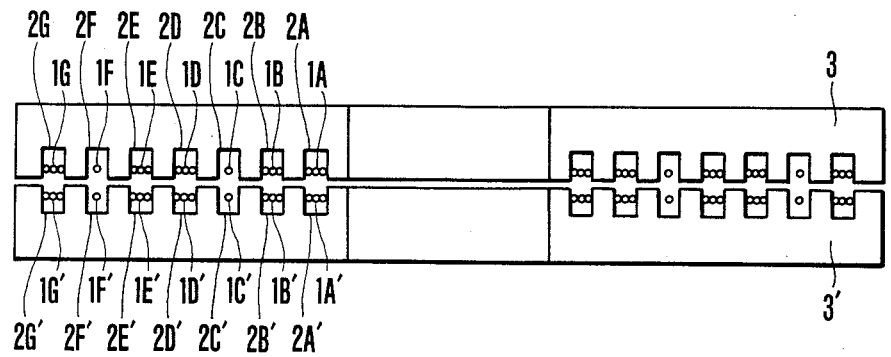
FIG. 1 is a sectional view illustrating an example of a 5-channel rotary transformer using short-circuit rings.
Figure 2:
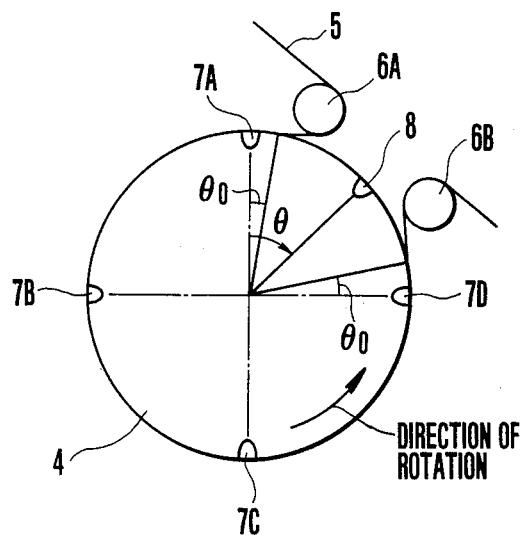
FIG. 2 is a plan view illustrating the head arrangement in the rotary head cylinder.
Figure 5:
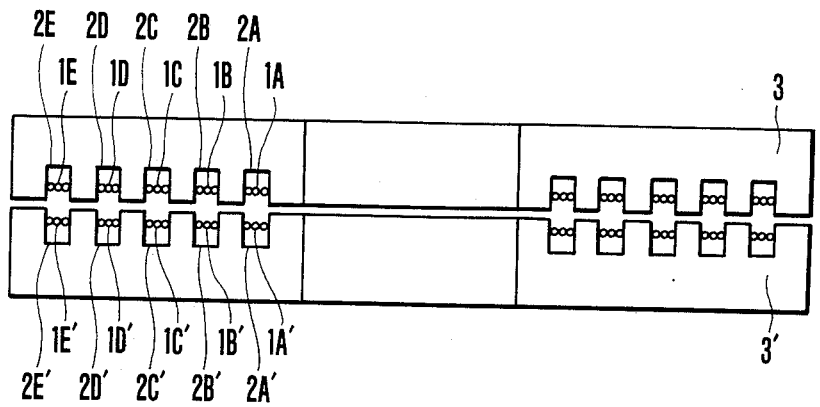
FIG. 5 is a sectional view illustrating the structure of the rotary transformer in one embodiment of the rotary head device according to the present invention.
Figure 7:
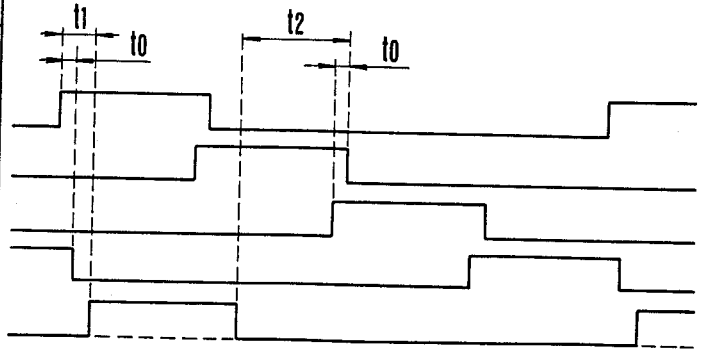
FIG. 7 is a timing chart illustrating a manner in which the circuit of FIG. 6 operates.
Figure 6:
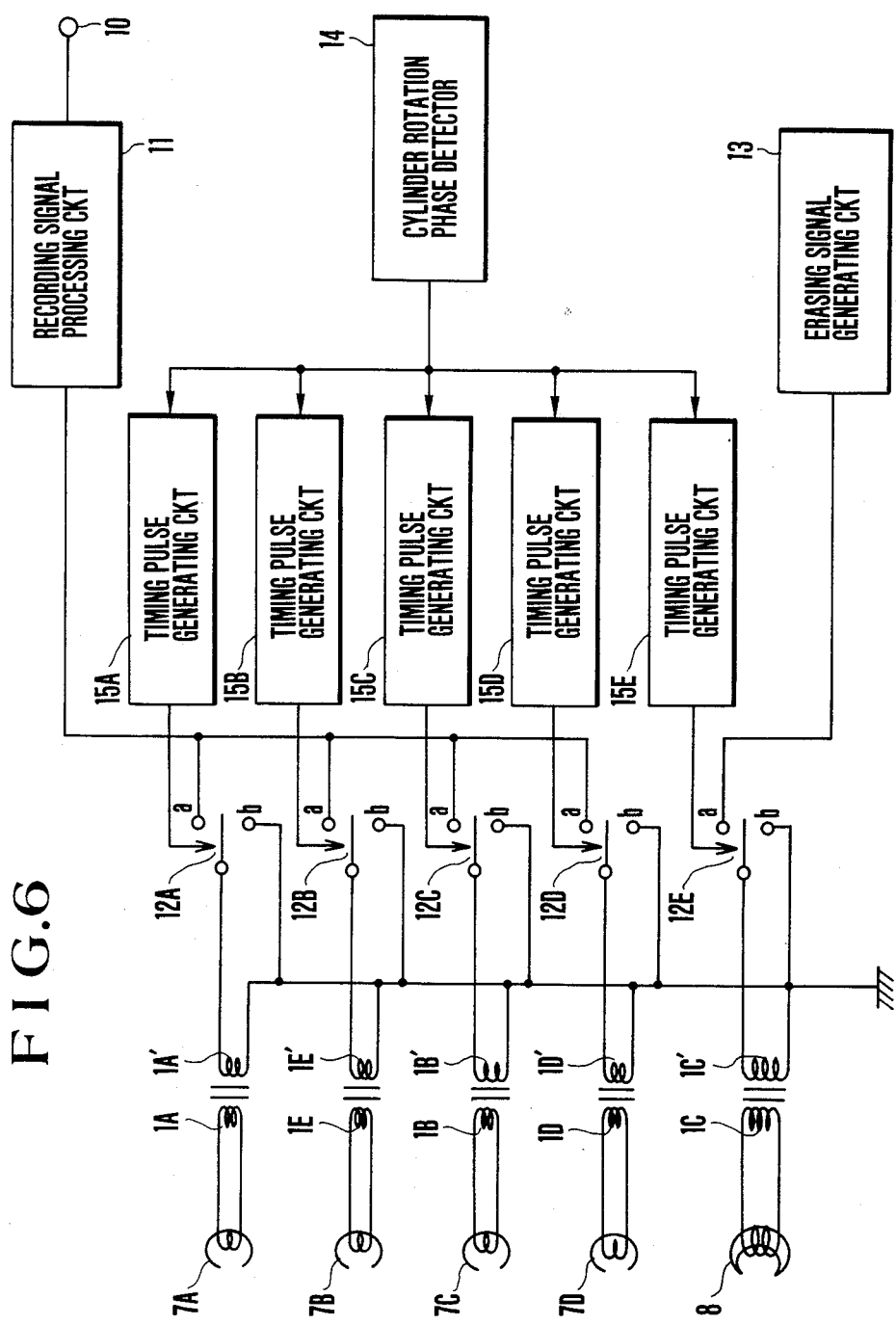
FIG. 6 is an electrical circuit diagram of the rotary head device of the invention.

The present invention is next described in connection with an embodiment thereof by reference to FIGS. 5 to 7. FIG. 5 in the sectional view illustrates the structure of construction of the rotary transformer in this embodiment. FIG. 6 illustrates the structure of the circuit of this embodiment. FIG. 7 is a timing chart illustrating the operation of each portion of the circuit of FIG. 6. The structure of the head drum is the same as that of the conventional one shown in FIG. 2.

In the drawing, five coils 1A to 1E are arranged in respective grooves 2A to 2E formed in the core 3 of the rotor. Another five coils 1A' to 1E' are arranged in respective grooves 2A' to 2E' formed in the core 3' of the stator. All the coils 1A to 1E are connected to all the heads 7A to 7D in the same eight combinations as those shown in FIG. 3 except that the erasing head 8 is connected to the coil C. Yet, in case when the $\theta$ defined in FIG. 2 has a value in a range of $-\theta_0 \leq \theta \leq 90° + \theta_0$, the combinations III and VI are excluded, because this value falls outside the range of $2\theta_0 \leq \theta \leq (3/2)\pi - 2\theta_0$ required from a condition: $t_1, t_2 \geq t_0 = 2\theta_0/w$ to be described later.

In this embodiment, the switching over of the head and the transformer is explained for the case of the combination II. In FIG. 6, video signals entering from an input terminal 10 are supplied to a recording signal processing circuit 11 where they are made to a signal form suited to magnetic recording. The output of the circuit 11 is supplied to each of switches 12A, 12B, 12C and 12D at their throws, a. All the switches 12A to 12D are controlled by respective timing pulse generating circuits 15A to 15D in such a manner that the video signals are supplied in units of one field successively to the heads 7A to 7D in this order as shown in FIG. 7. For note, the switches 12A to 12E are arranged so that when the timing pulse shown in FIG. 7 is high level, the movable pole of each of the switches 12A to 12E is connected to the throw, a, to supply the signal to the head 7A–7D, 8, and when low level, it is connected to another throw, b, to short-circuit each coil 1A'1E', 1B', 1D', or 1C' respectively. This timing pulse generating circuit 15A–15E produces each timing pulse on the basis of the phase detecting pulse supplied from a cylinder rotation phase detector 14 for detecting the phase of rotation of the rotary head cylinder 4.

An erasing signal generating circuit 13 produces an erasing signal to be applied to the rotary erasing head 8 when the switch 12E is connected to the "a" side.

Figures 3, 4:
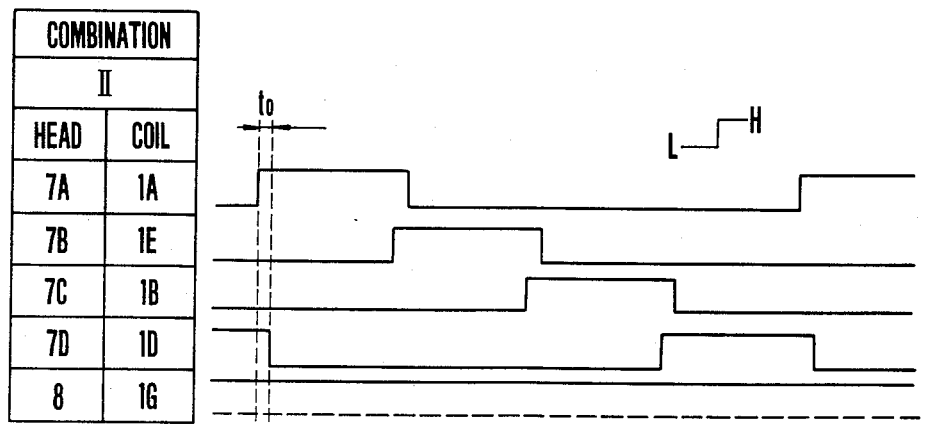
FIG. 3 is a table illustrating the combinations of connection between all heads and all coils.
FIG. 4 is a timing chart illustrating a manner in which all the heads and the transformer in the rotary transformer of FIG. 1 operate.

At first, when recording, the switching over of the recording signal supply state to the coil 1A, 1E, 1B, 1D connected to the head 7A–7D is the same as in the case of FIG. 4. For the coil 1C connected to the erasing head 8, the start of flow of erasing current is delayed by a time $t_1$ from the start of recording of the head 7A, and the flow of the erasing current is terminated a time $t_2$ earlier than the termination of recording of the head 7B. The short-circuiting of the stator side coil 1C' is held other than the time of flowing the current.

At this time, the above-stated times $t_1$ and $t_2$ are related to $\theta$ as follows:

$$\left\{ \theta - \left( \frac{\pi}{2} - 2\theta_0 \right) \right\}/w < t_1 \leq \theta/w,$$

$$\left\{ \left( \frac{3}{2}\pi - \theta \right) - \left( \frac{\pi}{2} - 2\theta_0 \right) \right\}/w < t_2 \leq \left( \frac{3}{2}\pi - \theta \right)/w$$

where w represents the angular velocity of the head drum. Also, from the condition: $t_1, t_2 \geq t_0 = 2\theta_0/w$, $\theta$ is taken at a value in the following range:

$$2\theta_0 \leq \theta \leq \left( \frac{3}{2}\pi - 2\theta_0 \right)$$

If, in such a way, $\theta$, $t_1$ and $t_2$ are determined, both coils 1C and 1B or both coils 1C and 1D will be prevented from being used simultaneously, thus eliminating the problem of cross-talk. The foregoing has been discussed in connection with the combination II. Even in the other combinations, the appropriate ranges of $t_1$, $t_2$ and $\theta$ can be defined similarly and are applicable. Also, as is obvious from FIG. 7, the erasing current is only once allowed to flow in each cycle of switching over of all the heads 7A to 7D. So, the erasing head 8 is necessarily enabled to erase at least 4 tracks in one tracing. Therefore, in this case, the head width must be determined so as to cover the four tracks or more. When reproducing, the stator side coil 1C may be short-circuited.

As in the above, in this embodiment, the rotary transformer is provided with concentric five grooves 2A to 2E of which the central one 2C contains the coil 1C connected to the erasing head, and this coil 1C is made not to be rendered operative in combination with its adjacent one, namely, the coil 1B or 1D when the heads 7A to 7D are switched over one at a time. This produces an advantage in that the cross-talk of the erasing current to the recording signal can be lessened.

Another advantage is that when the coils 1B and 1D are used simultaneously, the coil connected to the erasing head is short-circuited to permit reduction of even each other's interference of the recording signals between the coils 1B and 1D.

Further, along with such a cross-talk reducing effect, it becomes possible to reduce the size, particularly the diameter, of the rotary transformer by an amount corresponding to the two grooves by which the number of grooves is smaller than in the prior art, and also to reduce the production cost by that amount. Though, in the above-described embodiment, explanation has been made using the face-to-face type transformer, the same holds even for the periphery-to-periphery type transformer. In the latter case, the axial length can be reduced. For note, if the diameter is left the same, the characteristics can be improved.

As has been described above, according to this invention, due to the above-described features, the cross-talk between the channels can be lessened, and a rotary head device of reduced size with lower price can be obtained.

What is claimed is:

1. A rotary head type recording apparatus, comprising:
    (a) a rotary head member having four rotary heads and a rotary erasing head;
    (b) a rotary transformer member having an erasing coil which is connected to said rotary erasing head and four recording coils which are respectively connected to said four rotary heads, said erasing coil and said four recording coils lying in a common surface of said rotary transformer member, and said erasing coil being so disposed that two of said four recording coils are on each side of said erasing coil;
    (c) recording means for supplying recording signals to said four recording coils to record the recording signals on a recording medium by use of said four recording coils; and
    (d) erasing means for supplying an erasing signal to said erasing coil to erase signals recorded on the recording medium by use of said erasing head, said erasing means not supplying said erasing signal to said erasing coil when said recording means is supplying recording signals to at least one of two recording coils arranged adjacent to and on opposite sides of said erasing coil.

2. An apparatus according to claim 1, wherein said four rotary heads rotate with their phases differing 90° from each other.

3. An apparatus according to claim 2, wherein said recording means supplies recording signals to the adjacent two of said four rotary heads successively in each $\frac{3}{4}$ revolution, 4. An apparatus according to claim 3, wherein the width of the path covered by said rotary erasing head is wider than 4 times the pitch of the tracks formed on said recording medium.

5. An apparatus according to claim 3, wherein said recording means selectively supplies recording signals to said four rotary heads in such a manner that there exists a period during which the adjacent two of said rotary heads are supplied with said recording signals simultaneously.

6. An apparatus according to claim 5, wherein the two of the four recording coils which are connected to the adjacent two of said four rotary heads are disposed on respective opposite sides of said erasing coil.

7. An apparatus according to claim 1, further comprising a fixed transformer member having five fixed coils in confrontation to said four recording coils and said erasing coil respectively.

8. An apparatus according to claim 7, wherein said recording means includes means for short-circuiting the one of said four fixed coils which respectively confronts said four recording coils when said recording means is not supplying recording signals to the each of the four fixed coils.

9. An apparatus according to claim 7, wherein said erasing means includes means for short-circuiting that fixed coil which confronts said erasing coil when said erasing means is not supplying the erasing signal to the fixed coil.

10. A rotary head type recording apparatus, comprising:
    (a) a rotary head member having a plurality of rotary heads and a rotary erasing head;
    (b) a rotary transformer member having an erasing coil which is connected to said rotary erasing head, a first recording coil which is connected to one of said plurality of rotary heads and a second recording coil which is connected to another one of said plurality of rotary heads, said erasing coil, said first recording coil and said second recording coil lying in a common surface of said rotary transformer member, said first and second recording coils being disposed on respective opposite sides of said erasing coil;
    (c) recording means for supplying recording signals to said first and second recording coils to record the recording signals on a recording medium; and
    (d) erasing means for supplying an erasing signal to said erasing coil to erase the signal recorded on the recording medium, said erasing means not supplying said erasing signal to said erasing coil when said recording means supplies the recording signals to said first recording coil or said second recording coil.

* * * * *